(12) United States Patent
Huang

(10) Patent No.: US 7,999,413 B2
(45) Date of Patent: Aug. 16, 2011

(54) POWER SUPPLY CONTROL CIRCUIT

(75) Inventor: Yong-Zhao Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 114 days.

(21) Appl. No.: 12/502,240

(22) Filed: Jul. 14, 2009

(65) Prior Publication Data
US 2010/0314938 A1 Dec. 16, 2010

(30) Foreign Application Priority Data

Jun. 16, 2009 (CN) .......................... 2009 1 0303280

(51) Int. Cl.
*H02J 1/00* (2006.01)
*H02J 3/00* (2006.01)
(52) U.S. Cl. ........................................................ 307/80
(58) Field of Classification Search .................... 307/18, 307/28, 29, 80, 85, 86
See application file for complete search history.

(56) References Cited

U.S. PATENT DOCUMENTS
6,600,239 B2 * 7/2003 Winick et al. .................. 307/85
* cited by examiner

*Primary Examiner* — Jared Fureman
*Assistant Examiner* — Carlos Amaya
(74) *Attorney, Agent, or Firm* — Zhigang Ma

(57) ABSTRACT

A power supply control circuit includes a first switch unit comprising an input terminal to receive a control signal, and a number of second switch units. The second switch units are each connected between an input power source and a power output terminal. The first switch unit controls the number of second switch units to be turned on in response to the control signal being in a first status, so as to control the number of power output terminals to output corresponding power sources. The first switch unit controls the number of second switch units to be turned off in response to the control signal being in a second status, so as to direct the power output terminals to not output the corresponding power sources.

11 Claims, 3 Drawing Sheets

POWER SUPPLY CONTROL CIRCUIT

BACKGROUND

1. Technical Field

The present disclosure relates to control circuits and, particularly, to a power supply control circuit.

2. Description of Related Art

Electrical devices may require multiple power supplies, such as a 5 volt (V) power supply, a 3V power supply, and a 12V power supply. These power supplies may require corresponding power supply control circuits, each receiving an individual control signal for operation.

FIG. 1 shows a group of frequently used power supply control circuits, including a first power supply control circuit 100 outputting a first power supply signal +12V_BD, a second power supply control circuit 200 outputting a second power supply signal +5V_BD, and a third power supply control circuit 300 outputting a third power supply signal +5V_HDD. The first power supply control circuit 100 receives a +12V input power source and a first control signal SW1 to generate the first power supply signal +12V_BD. The second power supply control circuit 200 receives a +5V input power source and a second control signal SW2 to generate the second power supply signal +5V_BD. The third power supply control circuit 300 receives a +5V input power source and a third control signal SW3 to generate the third power supply signal +5V_HDD. Because the first power supply signal +12V_BD, the second power supply signal +5V_BD, and the third power supply signal +5V_HDD each require a corresponding power supply control circuit (100, 200, 300) and a control signal (SW1, SW2, SW3), design and deployment thereof are very complicated and may waste control signals.

DETAILED DESCRIPTION

Figure 1:
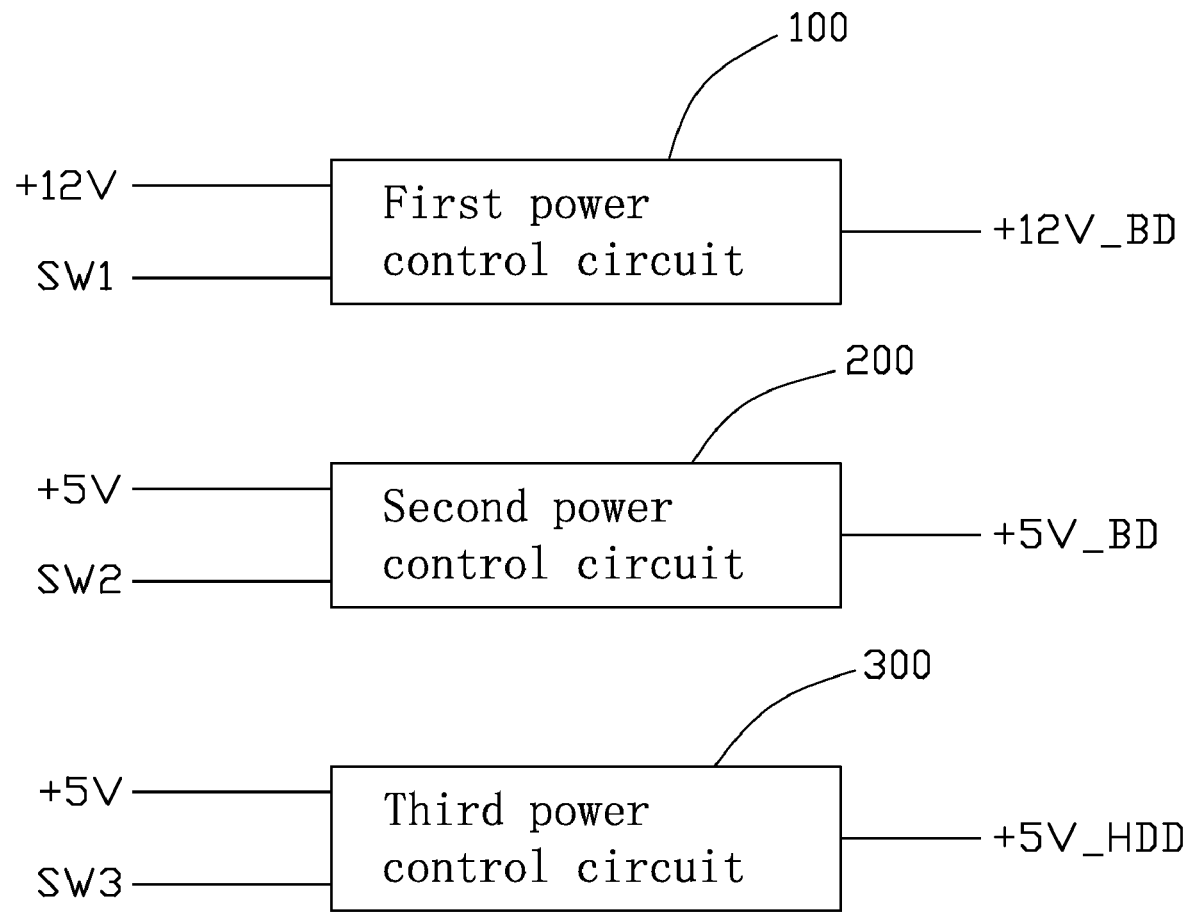
FIG. 1 is a block diagram of a group of related-art power supply control circuits.
Figure 2:
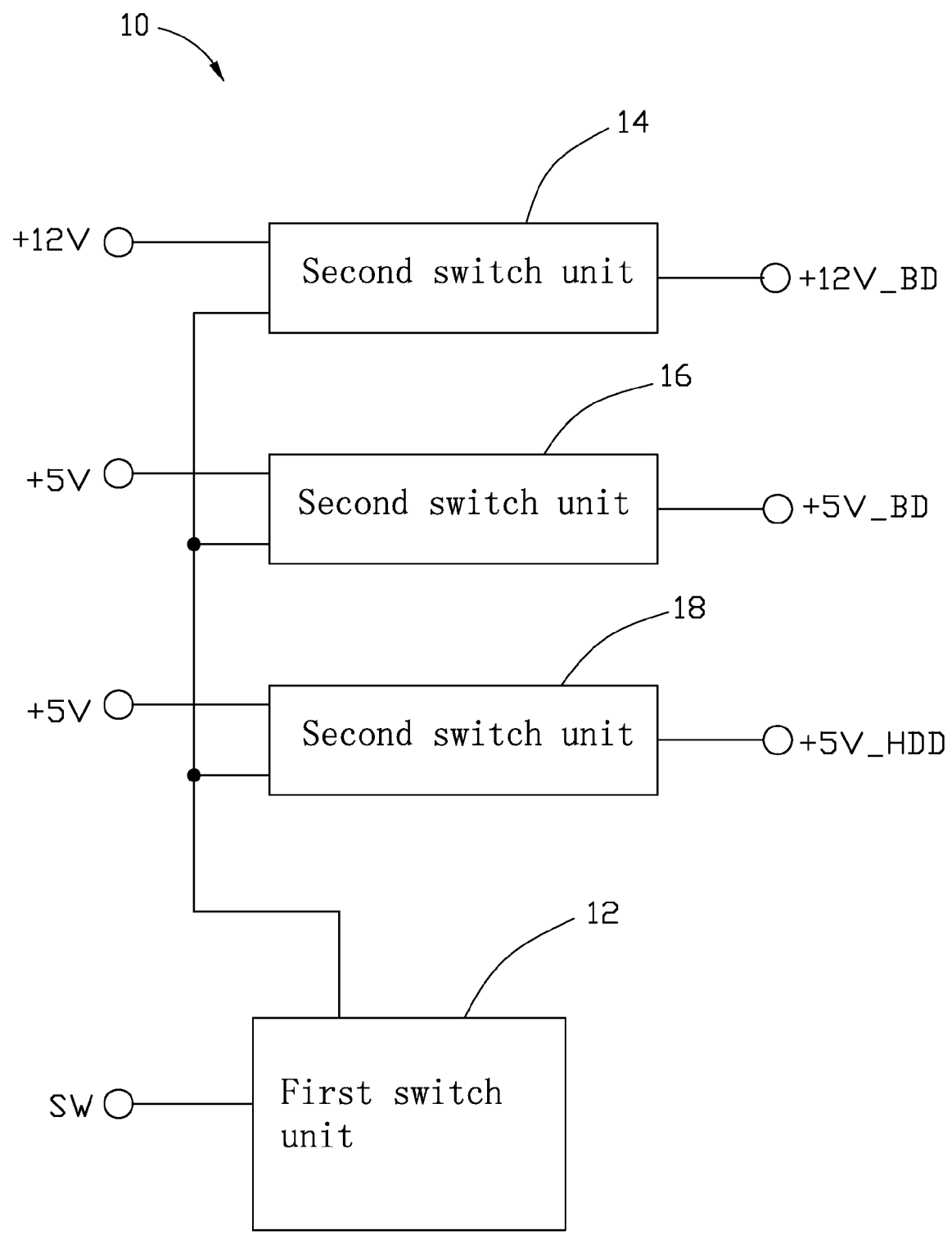
FIG. 2 is a block diagram of an exemplary embodiment of a power supply control circuit.
Figure 3:
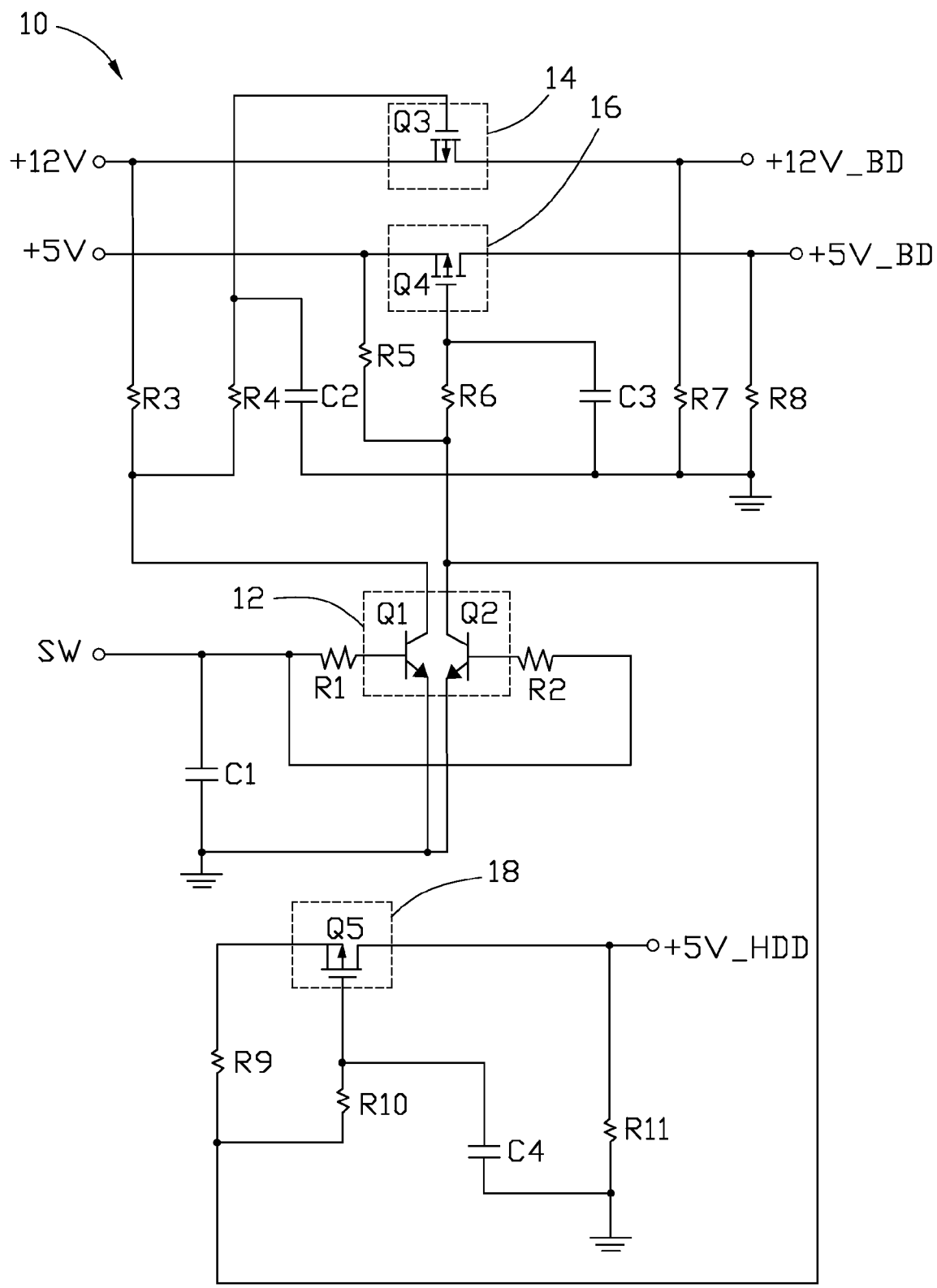
FIG. 3 is a circuit diagram of FIG. 2, together with resistors and capacitors.

Referring to FIGS. 2 and 3, an exemplary embodiment of a power supply control circuit 10 generates a plurality of power supply signals using a control signal SW. The power supply control circuit 10 includes a first switch unit 12, three second switch units 14, 16, and 18, eleven resistors R1-R11, and four capacitors C1-C4. In other embodiments, the number of the second switch units, the number of the resistors, and the number of the capacitors can be changed according to requirements.

In one embodiment, the first switch unit 12 includes two electrical switches, such as two transistors Q1 and Q2. The second switch unit 14 includes an electrical switch, such as a field-effect transistor (FET) Q3. The second switch unit 16 includes an electrical switch, such as an FET Q4. The second switch unit 18 includes an electrical switch, such as an FET Q5.

A base of the transistor Q1 as an input terminal of the power supply control circuit 10 receives the control signal SW via the resistor R1, and is grounded via the capacitor C1. A base of the transistor Q2 is connected to the base of the transistor Q1 to receive the control signal SW via the resistor R2, and is grounded via the capacitor C1. Emitters of the transistors Q1 and Q2 are grounded. A collector of the transistor Q1 is connected to a first input power source, such as a +12 volt (V) power source, via the resistor R3. The collector of the transistor Q1 is also connected to a gate of the FET Q3 via the resistor R4. A collector of the transistor Q2 is connected to a second input power source, such as a +5V power source, via the resistor R5. The collector of the transistor Q2 is also connected to a gate of the FET Q4 via the resistor R6.

The gate of the FET Q3 is grounded via the capacitor C2. The gate of the FET Q4 is grounded via the capacitor C3. A source of the FET Q3 is connected to the first input power source. A drain of the FET Q3 as a first power output terminal of the power supply control circuit 10 outputs a first power supply signal +12V_BD, and is grounded via the resistor R7. A source of the FET Q4 is connected to the second input power source. A drain of the FET Q4 as a second power output terminal of the power supply control circuit 10 outputs a second power supply signal +5V_BD, and is grounded via the resistor R8.

The collector of the transistor Q2 is also connected to a source of the FET Q5 via the resistor R9 and is connected to a gate of the FET Q5 via the resistor R10. The gate of the FET Q5 is grounded via the capacitor C4. A drain of the FET Q5 as a third power output terminal of the power supply control circuit 10 outputs a third power supply signal +5V_HDD, and is grounded via the resistor R11. In other embodiments, the number of the power supply signals can be changed by adjusting the corresponding number of the second switch units.

In use, when the control signal SW is a high voltage signal, such as a 5V voltage signal, the transistors Q1 and Q2 are turned on, such that FETs Q3, Q4, and Q5 are turned off. At this time, the power supply control circuit 10 cannot output any power supply signal. When the control signal SW is a low voltage signal, such as a 0V voltage signal, the transistors Q1 and Q2 are turned off, such that FETs Q3, Q4, and Q5 are turned on. At this time, the power supply control circuit 10 outputs the first-third power supply signals +12V_BD, +5V_BD, and +5V_HDD via the first-third power output terminals.

The disclosed power supply control circuit provides a plurality of power supply signals (+12V_BD, +5V_BD, and +5V_HDD) and uses only a single control signal SW, thus simplifying the system.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A power supply control circuit, comprising:
   a first switch unit comprising an input terminal to receive a control signal; and
   a plurality of input power sources and a plurality of power output terminals;
   a plurality of second switch units each connected between a corresponding input power source and a corresponding power output terminal, wherein the first switch unit directs the plurality of second switch units to turn on in response to the control signal in a first status, so as to direct the plurality of power output terminals to output corresponding power sources; the first switch unit turns the plurality of second switch units off in response to the control signal being in a second status, so as to control the plurality of power output terminals not to output the corresponding power sources.

2. The power supply control circuit of claim 1, wherein the first switch unit comprises two electrical switches.

3. The power supply control circuit of claim 2, wherein the two electrical switches are a first and a second transistors.

4. The power supply control circuit of claim 3, wherein a base of the first transistor functions as the input terminal to receive the control signal via a first resistor, and is grounded via a first capacitor, an emitter of the first transistor is grounded, a collector of the first transistor is connected to a first input power source of the plurality of input power sources via a second resistor.

5. The power supply control circuit of claim 4, wherein a base of the second transistor is connected to the base of the first transistor to receive the control signal via a third resistor, an emitter of the second transistor is grounded, and a collector of the second transistor is connected to a second input power source of the plurality of input power sources via a fourth resistor.

6. The power supply control circuit of claim 5, wherein the plurality of second switch units comprises three electrical switches.

7. The power supply control circuit of claim 6, wherein the three electrical switches are first to third field-effect transistors (FETs).

8. The power supply control circuit of claim 7, wherein a gate of the first FET is grounded via a second capacitor and is connected to the collector of the first transistor via a fifth resistor, a source of the first FET is connected to the first input power source, and a drain of the first FET functions as a first power output terminal of the plurality of power output terminals to output a first power supply signal and is grounded via a sixth resistor.

9. The power supply control circuit of claim 8, wherein a gate of the second FET is grounded via a third capacitor and is connected to the collector of the second transistor via a seventh resistor, a source of the second FET is connected to the second input power source, a drain of the second FET functions as a second power output terminal of the plurality of power output terminals to output a second power supply signal and is grounded via an eighth resistor.

10. The power supply control circuit of claim 9, wherein a source of the third FET is connected to the first switch unit via a ninth resistor, and a gate of the third FET is connected to the first switch unit via a tenth resistor, a gate of the third FET is also grounded via a fourth capacitor, and a drain of the third FET functions as a third power output terminal of the plurality of third power output terminals to output a third power supply signal and is grounded via an eleventh resistor.

11. The power supply control circuit of claim 1, wherein the first status of the control signal is a low voltage signal status, the second status of the control signal is a high voltage signal status.

\* \* \* \* \*